United States Patent [19]
DeWan

[11] Patent Number: 5,080,751
[45] Date of Patent: Jan. 14, 1992

[54] ROTARY HEAT SEALER

[75] Inventor: Dean A. DeWan, Antigo, Wis.

[73] Assignee: Dewan Sewing Inc., Antigo, Wis.

[21] Appl. No.: 388,656

[22] Filed: Aug. 2, 1989

[51] Int. Cl.⁵ .............................................. B32B 31/00
[52] U.S. Cl. ..................................... 156/579; 100/168;
    156/583.1; 156/583.8
[58] Field of Search ...................... 156/555, 579, 583.1,
    156/583.8; 100/168

[56] References Cited

U.S. PATENT DOCUMENTS

| | | | |
|---|---|---|---|
| 2,443,749 | 6/1948 | Stunkel | 156/579 |
| 2,751,966 | 6/1956 | Techtmann | 156/579 X |
| 2,906,847 | 9/1959 | Grevich | 156/555 X |
| 3,027,285 | 3/1962 | Eisner et al. | 156/583.1 X |
| 3,669,808 | 6/1972 | Klotzbach et al. | 100/168 X |
| 4,016,021 | 4/1977 | La Fleur | 156/154 |
| 4,128,451 | 12/1978 | Sorce et al. | 156/555 |
| 4,213,031 | 7/1980 | Farber | 219/244 |
| 4,469,549 | 9/1984 | Dietrich | 156/579 |
| 4,737,231 | 4/1988 | Seko et al. | 156/555 |

Primary Examiner—David A. Simmons
Assistant Examiner—James J. Engel, Jr.
Attorney, Agent, or Firm—Senniger, Powers, Leavitt & Roedel

[57] ABSTRACT

A relatively small, portable rotary heat sealer which may be held by a hand to support it during operation including a frame, and first and second wheels mounted on the frame. The wheels are rotatable with respect to the frame about respective first and second axes which are generally parallel to each other. Both wheels have rims, with the rim of the second wheel positioned adjacent the rim of the first wheel to define a nip for receiving heat sealable material. An electric motor rotates the second wheel about the second axis such that the heat sealable material is drawn into and through the nip. The rim of the first wheel is heated so that the material is sealed as it is drawn through the nip. A handle is affixed to the frame for carrying the rotary heat sealer and for supporting the heat sealer during its operation.

10 Claims, 3 Drawing Sheets

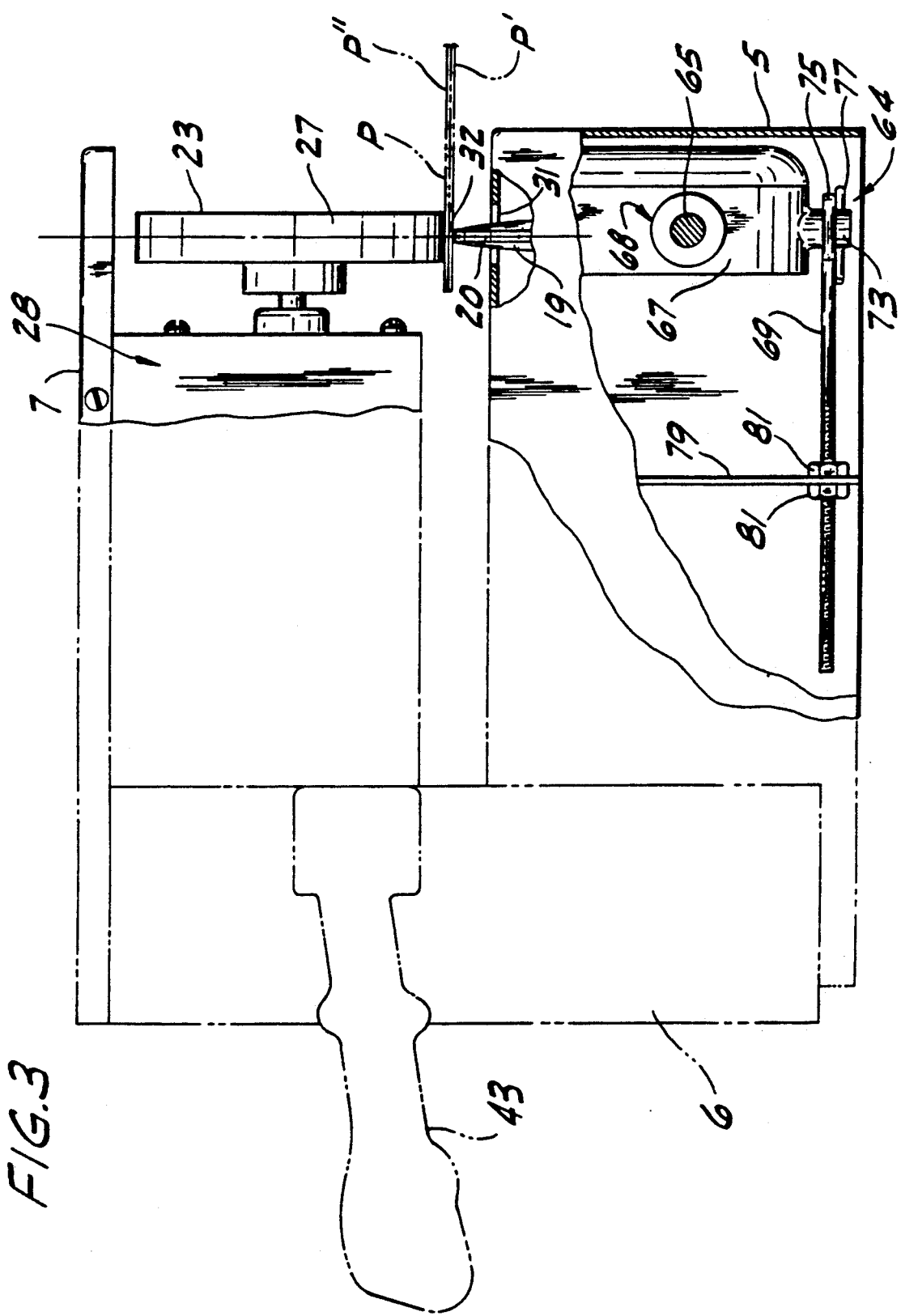

5,080,751

ROTARY HEAT SEALER

BACKGROUND OF THE INVENTION

This invention relates generally to a heat sealing apparatus and, in particular to a portable rotary heat sealer.

Conventional heat sealers, including rotary heat sealers, are typically very large and require considerable space for operation. The bulkiness of the machines also makes them difficult to transport.

Thus there is presently a need for a portable, hand-operable rotary heat sealer.

SUMMARY OF THE INVENTION

Among the several objects of this invention may be noted the provision of a rotary heat sealer which is portable; the provision of such a heat sealer which is adapted for hand-held operation; the provision of such a heat sealer which is adjustable to heat seal materials of different thicknesses; the provision of such a heat sealer which allows its operator to precisely position the material to be heat sealed; and the provision of such a heat sealer which is economical to manufacture.

In general, the invention involves a relatively small, portable rotary heat sealer adapted for hand-held operation. The heat sealer comprises a frame and a first wheel having a rim mounted on the frame for rotation on a first axis. A second wheel is mounted on the frame for rotation on a second axis generally parallel to the first axis, with the second wheel having a rim positioned adjacent the rim of the first wheel to define a nip for receiving heat sealable material. The heat sealer further includes means for effecting heating of the rim of at least one of the wheels. Suitable means effects rotation of the wheels with the rims of the wheels in contact with the heat sealable material so that it is adapted to move through the nip with the heat sealable material being heat sealed as it moves through the nip. The heat sealer also includes a handle affixed to the frame for carrying the rotary heat sealer and for supporting the heat sealer during operation thereof.

Other objects and features will be in part apparent and in part pointed out hereinafter.

BRIEF DESCRIPTION OF THE DRAWINGS

FIG. 3 is a side elevation of the rotary heat sealer of FIG. 1 with parts removed and other parts broken away to show the relative position of the rims of the wheels at the nip;

Corresponding reference characters indicate corresponding parts throughout the several views of the drawings.

DETAILED DESCRIPTION OF THE PREFERRED EMBODIMENT

Figure 1:
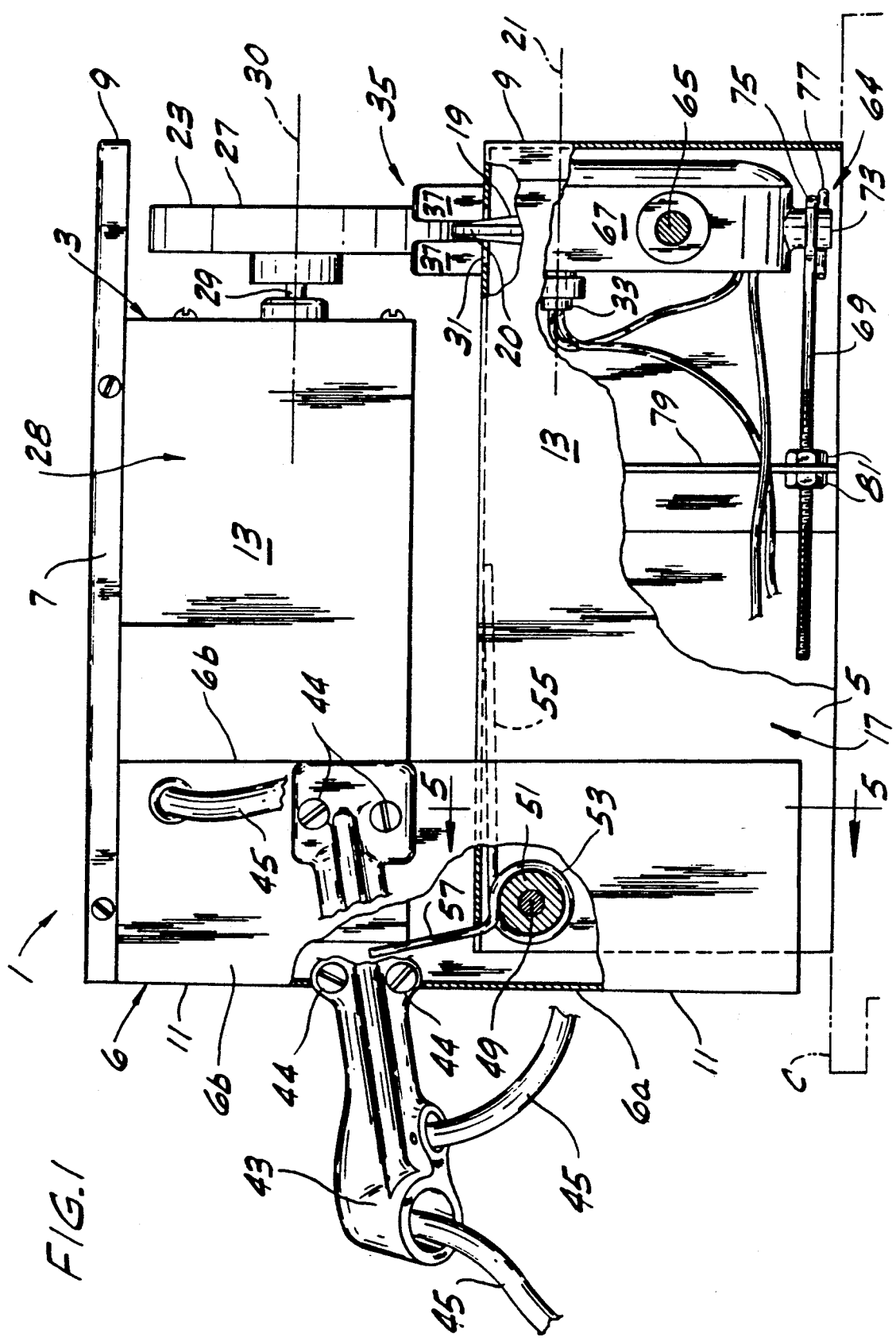
FIG. 1 is a side elevation of a rotary heat sealer of this invention with parts broken away to show details.

Referring now to the drawings, a relatively small, portable rotary heat sealer, indicated generally at 1, includes a frame generally designated 3 comprising a first (lower) frame member 5 and a second (upper) frame member 7 each having a front end 9, a rear end 11 and opposing sides 13, 15. The frame members 5, 7 are connected at their rear ends 11 by a channel-shaped end piece generally designated 6 having an end wall 6a and side walls 6b overlapping the sides 13, 15 of the frame members 5, 7. The first frame member 5 includes a housing, indicated generally at 17, for a first wheel 19 made of heat conductive material and having a rim 20. The first wheel 19 is mounted on the first frame member 5 generally adjacent its front end 9. The first wheel 19 is free to rotate on a first axis 21 extending endwise of the first frame member 5. A second wheel 23, also having a rim 27, is mounted on a shaft 29 supported by the second frame member 7 generally at its front end 9 for rotation of the wheel 23 on a second axis 30 extending endwise of the second frame member. Means for turning the shaft 29 and effecting rotation of the second wheel 23 comprises in this embodiment an electric motor (not shown) disposed in a housing, indicated generally at 28, on the second frame member 7.

Figure 2:
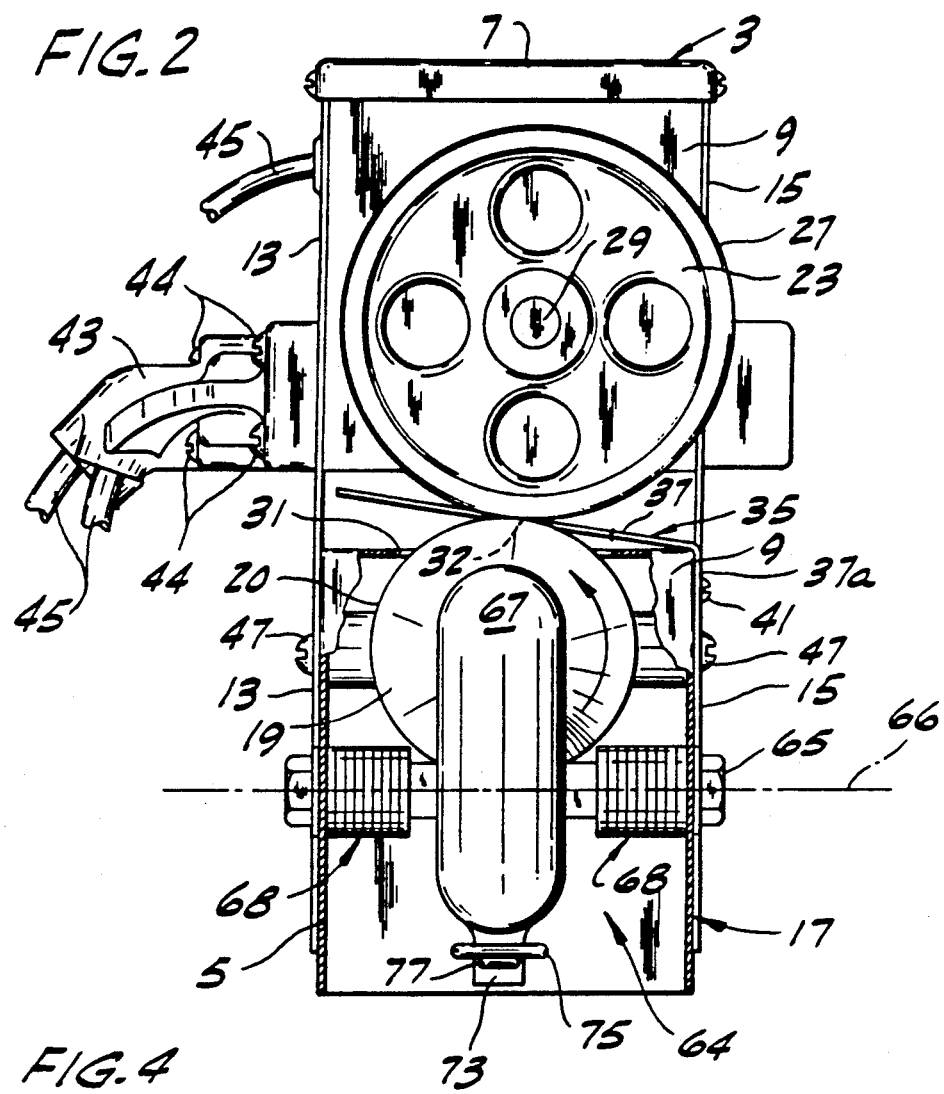
FIG. 2 is a front end view of the rotary heat sealer of this invention with parts broken away to show details.
Figure 4:
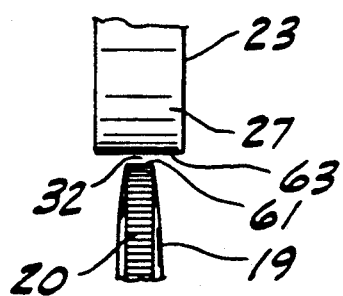
FIG. 4 is a fragmentary view of the nip of the rotary heat sealer of FIG. 1.

The first wheel 19 projects out of the housing 17 through an opening 31 with its rim 20 adjacent the rim 27 of the second wheel 23 to define a nip 32 (see FIG. 4). An electric heater 33 connected to the first wheel 19 heats the wheel including particularly its rim 20. In this embodiment, the electric heater 33 constitutes means for effecting heating of at least one of the first and second wheels. As shown in FIGS. 2 and 3, a leading edge of a portion of heat sealable material, such as the top portion p of a plastic bag, is receivable in the nip 32 and engages the rims 20, 27 of wheels 19, 23, respectively. It will be understood that the rotary heat sealer 1 of this invention may be used to seal not only plastic bags, but also heat sealable material in any form. The top portion p is drawn through the nip in side-to-side direction relative to the frame by rotation of the second (upper) wheel 23. The first (lower) wheel 19 also rotates as the top portion P is drawn through the nip 32 because of its engagement with the top portion. The top portion P of the plastic bag has opposite walls P', P" which are brought together in the nip 32 and sealed by the heated rim 20 of the first wheel 19, thus closing the bag along a line of seal.

Support means, indicated generally at 35, supports and guides the top portion P of the plastic bag as it is fed into the nip 32. The support means comprises a pair of elongate generally parallel support members in the form of two metal strips 37 extending in side-to-side direction relative to the frame 3 on opposite sides of the nip 32. These strips 37 define a path of travel for the top portion P of the plastic bag to move through the nip. The support members 37 have bent ends 37a secured by suitable fasteners 41 (only one is shown in FIG. 2) to side 15 of the first frame member 5, and the support members slope upwardly from side 15 toward and beyond the nip 32. The top portion P of the plastic bag being sealed is fed into the nip 32 from right to left as viewed in FIG. 2. The support members 37 limit the contact of the top portion P of the heat sealable material with the heated rim 20 of the first wheel in the area of the nip 32. In this way the bag is prevented from sticking to the first (lower) wheel 19 which could damage the bag by melting a hole in it and/or foul the first wheel with pieces torn from the bag.

The rotary heat sealer 1 is small enough to be hand carried by one person and has a handle 43 affixed by bolts 44 to the end piece 6 and to the second frame member 7 for carrying the rotary heat sealer and for supporting it during operation. An alternative to holding the heat sealer 1 manually during operation is to suspend the heat sealer by its handle 43 by suitable means such as a cable or a rope attached to the handle. The rotary heat sealer may also sit on a horizontal surface such as a countertop C during operation, as illustrated in FIG. 1. The relatively small size of the rotary heat sealer 1 and the provision of the handle 43 allows it to be easily and quickly hand carried from place to place by a single person as required. In circumstances where there is no counter space available or it is otherwise inconvenient or impossible to set the rotary heat sealer down, it may be held by its handle during operation. When hand-held during operation, the front ends 9 of the frame members face generally downward. The handle 43 also serves as a conduit for an electric cord 45 supplying power to the electric motor and electric heater 33. A trigger switch (not shown) on the handle may be depressed to actuate the motor for turning the second wheel 23 and to energize the electric heater 33 for heating the first wheel 19.

Figure 5:
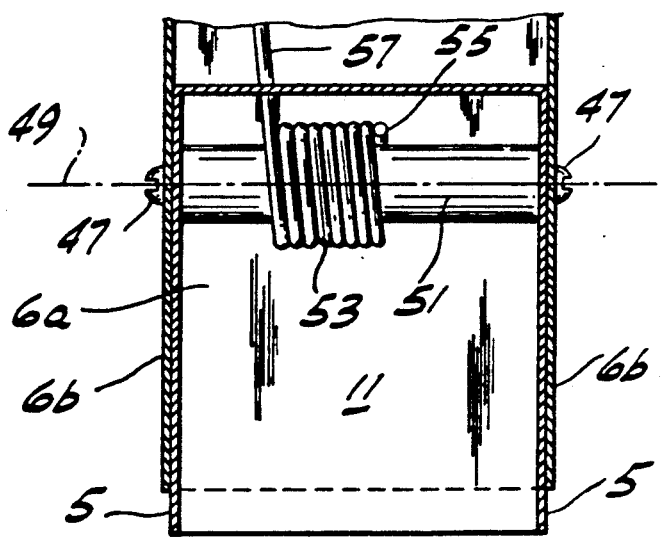
FIG. 5 is a section of the rotary heat sealer taken in the plane including line 5—5 of FIG. 1.

The channel shaped end piece 6 is fixedly attached to the second (upper) frame member 7, as by welding. The first (lower) frame member 5 is fastened by screws 47 or the like to the end piece 6 for pivotal movement of the first frame member relative to the second frame member 7 on a third axis 49 extending in side-to-side direction of the frame members (FIG. 5). A torsion spring 53 coiled around a shaft 51 has a first radially outwardly projecting arm 55 which engages the first frame member 5 and a second radially outwardly projecting arm 57 which engages the second frame member 7. The frame members are thus biased toward a closed position in which the rims 20, 27 of the wheels 19, 23 are in contact (or at least very close proximity). When the top portion P of the plastic bag is received in the nip 32, the first wheel 19 is displaced sightly from the second wheel 23 according to the thickness of the material. This is accomplished by a pivoting motion of the first frame member 5 with respect to the second frame member 7 on the third axis 49. The torsion spring 53 keeps the wheels 19, 23 in constant engagement with the material so that a line of seal is formed continuously across the top portion P of the plastic bag.

The frame members 5, 7 may be swung wide apart to facilitate cooling of the wheels 19, 23. Further, the operator may swing open the frame members 5, 7 in order to precisely position the material to be sealed, such as when only a small area of the material is to be sealed. It will be understood that means (not shown) for locking the frame members 5, 7 may also be provided. With the frame members locked open, an operator may use both hands to position the material.

When the frame members 5, 7 are in their closed position, the axes of rotation 21, 30 of the wheels 19, 23 are parallel, as are the rim surfaces 61, 63 of the wheels defining the nip 32 (see FIG. 4). It is important that these rim surfaces remain parallel when making a seal to insure that the line of seal is of a uniform width corresponding to the full width of the rim surface 61 of the first wheel 19. If the rim surfaces are oblique relative to one another, the seal is likely to be narrower and weaker. Therefore, to maintain the rim surfaces 61, 63 defining the nip 32 parallel, some adjustment must be made as the frame members pivot relative to one another to accommodate heat sealable material of different thicknesses.

Such adjustment is accomplished in the present invention by means indicated generally at 64 for adjusting the axial orientation of the wheels 19, 23 relative to one another to insure that the rim surfaces 61, 63 defining the nip 32 are parallel with one another. More specifically, means 64 comprises a shaft 65 mounted on the first frame member 5 for rotation about a fourth axis 66 (FIG. 2) relative to the first frame member, and a support member 67 pivoted on the shaft 65 (the shaft 65 and support member 67 thus constituting means mounting the first wheel 19 for pivotal movement about the fourth axis 66). Spacers indicated generally at 68 are used on the shaft 65 to center the wheel support 67 with respect to the opening 31 in the housing 17. The first wheel 19 is mounted on the support member 67 and is free to rotate relative to the support member about the first axis 21. The shaft 65 may be rotated to pivot the support member 67 and the first wheel 19 to a selected position of pivotal adjustment (that is, to a position where the rim surfaces 61, 63 defining the nip 32 are parallel).

The pivotal adjustment means 64 further comprises a rod 69, constituting locking means in this embodiment, which has connections to the first frame member 5 and the wheel support 67. The axial orientation or pitch of the wheel support 67 and hence the first wheel 19 is adjusted and locked by varying the point of connection of the rod 69 with the first frame member 5. The bottom of the wheel support 67, as viewed in FIG. 3, has an integral, outwardly projecting cylindric stud 73 which is received in an eye (not shown) of a loop 75 formed at one end of the rod 69. The rod is held on the stud 73 by a cotter pin 77 inserted through the stud. The other end of the rod 69 is received through a hole in a plate 79 extending side-to-side of the first frame member 5 in a plane generally perpendicular to the axis 21 of the first (lower) wheel 19. Two nuts 81, which are too large to pass through the hole in the plate 79, are threaded on the rod 69 on either side of the plate and secure the rod to the plate.

The length of rod 69 projecting from the plate 79 toward the front end 9 of the first frame member 5 can be adjusted by turning the nuts 81 on the rod to vary their axial position such that the connection of the rod to the plate is adjustable lengthwise of the rod. As is seen in FIG. 3, by adjusting the length of the rod 69 projecting forward of the plate 79, the wheel support 67 will be pivoted on the shaft 65 to a selected axial orientation with respect to the axis of rotation of the second wheel 23. It will be understood that any suitable means for adjusting and locking the pivotal position of the first wheel 19 may be used, including having the connection of the rod 69 to the wheel support 67 be adjustable lengthwise of the rod.

Thus a rotary heat sealer constructed according to the principles of this invention is sufficiently small and provided with a handle so that it is easily transported by a single person. The rotary heat sealer may rest on a horizontal surface such as a countertop during operation, or be supported by its handle. When operated in the hand-held position, the rotary heat sealer requires no work space be made available on shelves or countertops. Further, the size of the nip 32 is adjustable so that heat sealable materials of different thicknesses may be received in the nip. The rod 69 allows adjustment of the relative pivotal position of the wheels 19, 23 corresponding to the thickness of the material so that the rim surface 20 of the heated first wheel remains in full-width contact with the heat sealable material to ensure a wide, strong line of seal.

As various changes could be made in the above constructions without departing from the scope of the invention, it is intended that all matter contained in the above description or shown in the accompanying drawings shall be interpreted a illustrative and not in a limiting sense.

What is claimed is:

1. A relatively small, portable rotary heat sealer adapted for hand-held operation comprising, a frame, a first wheel mounted on the frame for rotation on a first axis, said first wheel having a rim, a second wheel mounted on the frame for rotation on a second axis generally parallel to said first axis, said second wheel having a rim positioned adjacent the rim of the first wheel to define a nip for receiving heat sealable material, means for effecting heating of the rim of at least one of said first and second wheels, means for effecting rotation of the wheels with the rims of the wheels in contact with said heat sealable material whereby the heat sealable material is adapted to move through the nip of the wheels with the material being heat sealed as it moves through the nip, a handle affixed to the frame for carrying the rotary heat sealer and for supporting the heat sealer during operation thereof, and support means for supporting said heat sealable material as it moves toward, into and through the nip, said support means comprising a pair of elongate support fingers mounted on the frame generally adjacent the first wheel, said fingers extending from the frame on opposite sides of the nip with at least a portion of said first wheel projecting between the fingers.

2. A rotary heat sealer for heat sealing portions of heat sealable material such as the open top portions of a plastic bag, the rotary heat sealer comprising, first and second frame members each having first and second ends, a first wheel having a rim, said first wheel being mounted on the first frame member generally adjacent the first end thereof for rotation on a first axis, a second wheel having a rim, said second wheel being mounted on said second frame member generally at the first end thereof for rotation on a second axis with the rims of said wheels adjacent one another to define a nip for receiving said portions of heat sealable material, means for effecting heating of the rim of at least one of said first and second wheels thereby to heat seal said heat sealable material as it passes through the nip, said frame members being pivotally connected generally at their second ends for pivotal movement of the frame members about a third axis extending generally perpendicular to said first and second axes, said first and second frame members being substantially spaced apart when the first and second wheels are generally abutting each other, and means for adjusting the axial orientation of the first and second wheels relative to one another to insure that the rim surfaces defining the nip are parallel with one another, said means for adjusting the axis orientation of the wheels comprises means mounting said first wheel for pivotal movement about a fourth axis generally perpendicular to a plane including said first and second axes, and means for locking said first wheel in a selected position of pivotal adjustment, said means mounting said first wheel for pivotal movement about said fourth axis comprising a shaft carried by said first frame member for rotation on said fourth axis, and a wheel support on said shaft supporting said first wheel, said shaft being rotatable to pivot the wheel support and the first wheel to a selected position of pivotal adjustment, said locking means comprising a rod having connections with the first frame member and said wheel support, at least one connection being adjustable lengthwise of the rod to vary the pivotal position of the wheel support and first wheel carried thereby.

3. The rotary heat sealer as set forth in claim 2 wherein the sealer is of a size sufficiently small for it to be hand carried by a single person, said sealer further comprising a handle affixed to said second frame member for carrying the rotary heat sealer and for supporting the heat sealer during operation thereof.

4. The rotary heat sealer as set forth in claim 3 wherein said second frame member is adapted to rest on a generally horizontal surface such as a countertop with said second axis substantially parallel to the horizontal surface.

5. A rotary heat sealer for heat sealing portions of heat sealable material such as the open top portions of a plastic bag, the rotary heat sealer comprising, first and second frame members each having first and second ends, a first wheel having a rim, said first wheel being mounted on the first frame member generally adjacent the first end thereof for rotation on a first axis, a second wheel having a rim, said second wheel being mounted on said second frame member generally at the first end thereof for rotation on a second axis with the rims of said wheels adjacent one another to define a nip for receiving said portions of heat sealable material, means for effecting heating of the rim of at least one of said first and second wheels thereby to heat seal said heat sealable material as it passes through the nip, said frame members being pivotally connected generally at their second ends for pivotal movement of the frame members about a third axis extending generally perpendicular to said first and second axes, said first and second frame members being substantially spaced apart when the first and second wheels are generally abutting each other, means for adjusting the axial orientation of the first and second wheels relative to one another to insure that the rim surfaces defining the nip are parallel with one another, said means for adjusting the axial orientation of the wheels comprises means mounting said first wheel for pivotal movement about a fourth axis generally perpendicular to a plane including said first and second axes, and means for locking said first wheel in a selected position of pivotal adjustment, means for effecting rotation of at least one of said first and second wheels with the rims of said wheels in contact with said heat sealable material whereby the heat sealable material is adapted to move through the nip of the wheels with the material being heat sealed as it moves through the nip, support means for supporting said heat sealable material as it moves into and through the nip, said support means comprises a pair of elongate support fingers mounted on said first frame member generally at the first end thereof, said support fingers extending from said first frame member on opposite sides of the nip, with at least a portion of said first wheel projecting between the fingers.

6. A relatively small, portable rotary heat sealer for heat sealing portions of heat sealable material such as the open top portions of a plastic bag or the like, the rotary heat sealer comprising, first and second frame members each having front and rear ends and opposite sides, a first wheel having a rim, said first wheel being mounted on the first frame member generally adjacent its front end for rotation on a first axis extending endwise of the frame member, a second wheel having a rim, said second wheel being mounted on said second frame member generally at the first end thereof for rotation on a second axis extending endwise of the frame member with the rims of the wheels adjacent one another to define a nip for receiving said portions of heat sealable material.

means for effecting heating of the rim of at least one of said first and second wheels thereby to heat seal said heat sealable material as it passes through the nip, said frame members being connected at their rear ends for pivotal movement on a third axis extending in side-to-side direction with respect to the frame members, said first and second frame members being substantially spaced apart when the first and second wheels are generally abutting each other, and means for adjusting the axial orientation of the first and second wheels relative to one another to insure that the rim surfaces defining the nip are parallel with one another, said means for adjusting the axial orientation of the wheels comprising means mounting said first wheel for pivotal movement about a fourth axis extending in side-to-side direction with respect to the frame members, and means for locking said first wheel in a selected position of pivotal adjustment, said means mounting said first wheel for pivotal movement about said third axis comprising a shaft carried by said first frame member for rotation on said third axis, and a wheel support on said shaft supporting said first wheel, said shaft being rotatable to pivot the wheel support and the first wheel to a selected position of pivotal adjustment, said locking means comprising a rod having connections with the first frame member and said wheel support, at least one connection being adjustable lengthwise of the rod to vary the pivotal position of the wheel support and first wheel carried thereby.

7. The rotary heat sealer as set forth in claim 6 further comprising means for effecting rotation of the wheels with the rims of the wheels in contact with said heat sealable material whereby the heat sealable material is adapted to move through the nip of the wheels with the material being heat sealed as it moves through the nip.

8. The rotary heat sealer as set forth in claim 7 further comprising support means for supporting said heat sealable material as it moves into and through the nip.

9. The rotary heat sealer as set forth in claim 8 wherein said support means comprises a pair of support members mounted on said first frame member generally at the first end thereof, said support members extending from said first frame member on opposite sides of the nip.

10. The rotary heat sealer as set forth in claim 9 comprising spring means for biasing said frame members toward a closed position wherein the nip has its smallest size.

* * * * *